(12) United States Patent
Di Giacomo et al.

(10) Patent No.: US 7,901,311 B2
(45) Date of Patent: Mar. 8, 2011

(54) BELT DRIVE ASSEMBLY FOR DRIVING ACCESSORY PARTS OF AN INTERNAL COMBUSTION ENGINE, DRIVE BELT AND PULLEYS SUITED TO BE USED IN SAID ASSEMBLY

(75) Inventors: Tommaso Di Giacomo, Martino Sulla Marrucina (IT); Heinz Lemberger, Unterföhring (DE)

(73) Assignee: Dayco Europe S.r.l., Chieti (IT)

( * ) Notice: Subject to any disclaimer, the term of this patent is extended or adjusted under 35 U.S.C. 154(b) by 675 days.

(21) Appl. No.: 11/260,473

(22) Filed: Oct. 28, 2005

(65) Prior Publication Data
US 2006/0100051 A1 May 11, 2006

(30) Foreign Application Priority Data
Oct. 28, 2004 (EP) .................................... 04425806

(51) Int. Cl.
*F16H 7/00* (2006.01)
*F16H 55/49* (2006.01)

(52) U.S. Cl. .......... 474/148; 474/260; 474/170; 474/205

(58) Field of Classification Search .................... 47/170, 47/260, 148, 205
See application file for complete search history.

(56) References Cited

U.S. PATENT DOCUMENTS

| 655,281 | A | * | 8/1900 | Sundt ............................. 474/64 |
| 3,151,491 | A | | 10/1964 | Case |
| 3,313,166 | A | * | 4/1967 | Elster ........................... 474/148 |
| 3,404,576 | A | * | 10/1968 | Cicognani et. al. ........... 474/148 |
| 3,603,296 | A | | 9/1971 | Mitchell |
| 3,643,518 | A | * | 2/1972 | Semin et al. .................. 474/139 |
| 4,011,766 | A | * | 3/1977 | Waugh ........................... 474/238 |
| 4,028,955 | A | * | 6/1977 | Fisher et al. .................... 474/87 |
| 4,416,649 | A | * | 11/1983 | Kohrn ............................ 474/153 |
| 4,525,158 | A | * | 6/1985 | Tanaka et al. ................. 474/167 |
| 4,548,592 | A | * | 10/1985 | Ohhashi et al. ............... 474/168 |
| 4,571,224 | A | | 2/1986 | Arinaga et al. |
| 4,702,729 | A | | 10/1987 | Tanaka et al. |
| 4,884,998 | A | * | 12/1989 | Miranti, Jr. .................... 474/205 |
| 4,998,906 | A | * | 3/1991 | Moss ............................. 474/153 |
| 5,055,090 | A | * | 10/1991 | Miranti, Jr. .................... 474/249 |
| 5,308,291 | A | | 5/1994 | Robertson et al. |
| 5,484,321 | A | * | 1/1996 | Ishimoto ....................... 446/433 |
| 6,123,473 | A | | 9/2000 | Guillen et al. |
| 2002/0098935 | A1 | * | 7/2002 | Danhauer et al. ............. 474/261 |
| 2005/0096169 | A1 | * | 5/2005 | Reichard ....................... 474/152 |

FOREIGN PATENT DOCUMENTS

EP        1 225 368        2/2002

* cited by examiner

*Primary Examiner* — Bradley T King
*Assistant Examiner* — Mahbubur Rashid
(74) *Attorney, Agent, or Firm* — Venable LLP; Robert Kinberg; Steven J. Schwarz

(57) ABSTRACT

Belt drive assembly for driving accessory parts of an internal combustion engine comprising a reversible electric machine, comprising a belt with a plurality of longitudinal ribs alternating with grooves and with a plurality of cavities spaced at equal distances from each other longitudinally and obtained transversely with respect to the ribs in such a way as to interrupt them; the pulley comprises a plurality of ribs suited to engage the grooves of the belt and a plurality of teeth transverse with respect to the ribs, spaced at equal distances from each other on the circumference and suited to engage the respective cavities of the belt. The cavities of the belt have a depth at the most equal to the height of the ribs of the belt itself, and the ribs of the pulley have a radial height larger than the teeth, so as to cooperate with the belt continuously along the whole winding arc.

8 Claims, 3 Drawing Sheets

BELT DRIVE ASSEMBLY FOR DRIVING ACCESSORY PARTS OF AN INTERNAL COMBUSTION ENGINE, DRIVE BELT AND PULLEYS SUITED TO BE USED IN SAID ASSEMBLY

CROSS-REFERENCE TO RELATED APPLICATION

This application claims the priority of European Patent Application No. 04425806.9 filed Oct. 28, 2004, the subject matter of which is incorporated herein by reference.

BACKGROUND OF THE INVENTION

The present invention concerns a belt drive, particularly for driving accessory parts of an internal combustion engine, of the type that uses a belt with multiple poly-V grooves.

The present invention has a preferred application in the transmission of movement between the internal combustion engine of a motor vehicle and a plurality of accessories of the engine comprising a reversible electric machine.

In the internal combustion engines of motor vehicles, to avoid installing a separate generator and starting motor, it is common practice to provide a single electric machine of a reversible type, commonly known as a starter/generator, which is able to act both as a generator, when it is activated by the internal combustion engine in normal running conditions to charge the battery of the vehicle, and as a starter, that is as an electric motor able to drag the internal combustion engine during starting.

In particular, movement is transmitted between the internal combustion engine and the starter/generator by means of a poly-V belt used for driving other accessories such as, for example, the compressor of the air-conditioning system and the water pump. The belt presents a plurality of continuous longitudinal ridges or ribs, defining V-shaped grooves between each other, and it cooperates with a pulley keyed onto the engine shaft and with a plurality of pulleys integral with the shafts of the respective accessories, and in particular with a pulley keyed onto the shaft of the starter/generator. The poly-V belt transmits movement by friction between the sides of the grooves and the sides of the corresponding ribs on the circumferences of the pulleys which engage the respective grooves.

In particularly damp conditions, there may be a strong reduction of the friction coefficient between the belt and the pulleys. In particular, tests carried out have revealed that, at starting, there may be slipping between the belt and the pulley of the starter/generator, which in this case has a drive function. The problem occurs mainly due to the high torque to be transmitted and due to the fact that the arc of winding the belt onto said pulley cannot be increased beyond certain limits for reasons of bulk and the layout of the drive.

Besides causing undesirable noises and premature wear of the belt, slipping between the belt and the pulley of the starter/generator can even prevent the starting of the internal combustion engine. It is therefore a problem that can seriously threaten the reliability of the motor vehicle.

U.S. Pat. No. 4,571,224 illustrates a belt drive system of the synchronous type, comprising a toothed belt and pulley. The pulley has continuous V-shaped circumferential ribs, shorter or of the same height as the teeth, which cooperate with corresponding longitudinal grooves on the teeth of the belt and having a depth shorter than or equal to the height of the teeth. Movement is transmitted through the meshing and coupling of circumferential ribs and grooves and has the function of preventing the lateral deviation of the belt.

This belt drive is therefore unsuitable to drive accessory parts of an internal combustion engine, particularly in the case where a reversible electric machine is used, in which the high torques to be transmitted require the use of a poly-V type belt.

SUMMARY OF THE INVENTION

The aim of the present invention is to provide a belt drive, particularly for driving accessory parts of an internal combustion engine in a motor vehicle comprising a reversible electric machine, which allows the effective, simple and economic solution of the disadvantages described above.

This aim is achieved by a belt drive according to claim 1.

The present invention also concerns a belt drive according to claim 9 and a pulley according to claim 13.

BRIEF DESCRIPTION OF THE DRAWINGS

The invention will now be described with reference to the enclosed drawings, which illustrate a non-limiting embodiment of the invention, in which.

DETAILED DESCRIPTION OF THE INVENTION

Figure 1:
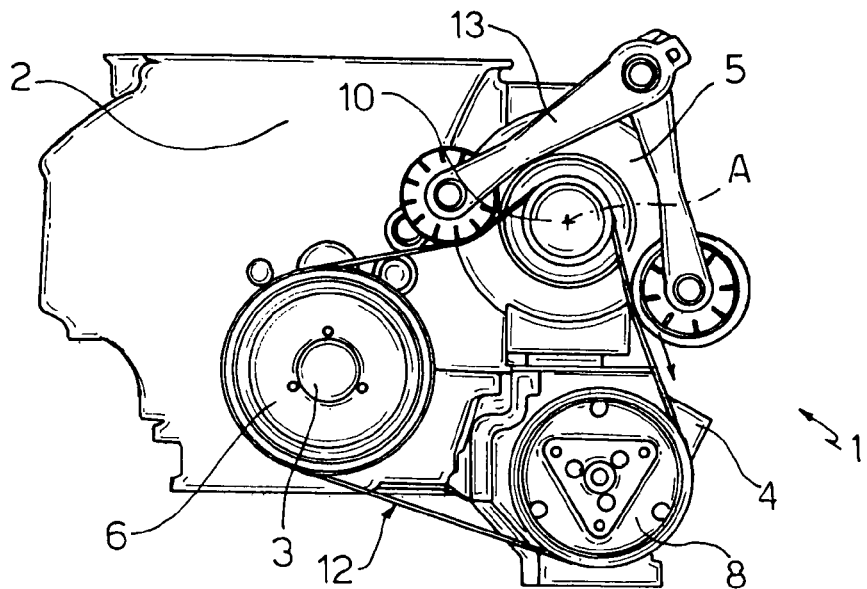
FIG. 1 is a schematic front view of a preferred embodiment of a belt drive assembly according to the present invention.

In FIG. 1, the reference 1 indicates the in its entirety a belt drive assembly for a motor vehicle, suitable to transmit movement between an internal combustion engine 2 and a plurality of auxiliary parts. These auxiliary parts comprise, in particular, a compressor 4 of an air conditioning system and an electric machine 5 of a reversible type or starter/generator, which is able to act both as a generator, when it is activated by the engine 2 in normal running conditions to charge the vehicle's electric energy accumulators (not illustrated), and as a starter, that is as an electric motor to turn over the engine 3 and make it start.

The assembly 1 comprises a pulley 6 keyed onto the engine shaft 3 of the engine 2, a pulley 8 keyed onto the drive shaft of the compressor 4, a pulley 10 keyed onto the shaft of the starter/generator 5, and a transmission belt 12, which is wound onto the pulleys 6, 8, 10 to transmit movement between the above-mentioned shafts and is subject to the tensioning action of a tensioner 13 of the double-arm type, not described in detail as it is already known.

The belt 12 comprises a ring-shaped body 15 of elastomeric material, which embodies a plurality of resistant longitudinal filiform inserts 17 or "cords".

Figure 2:
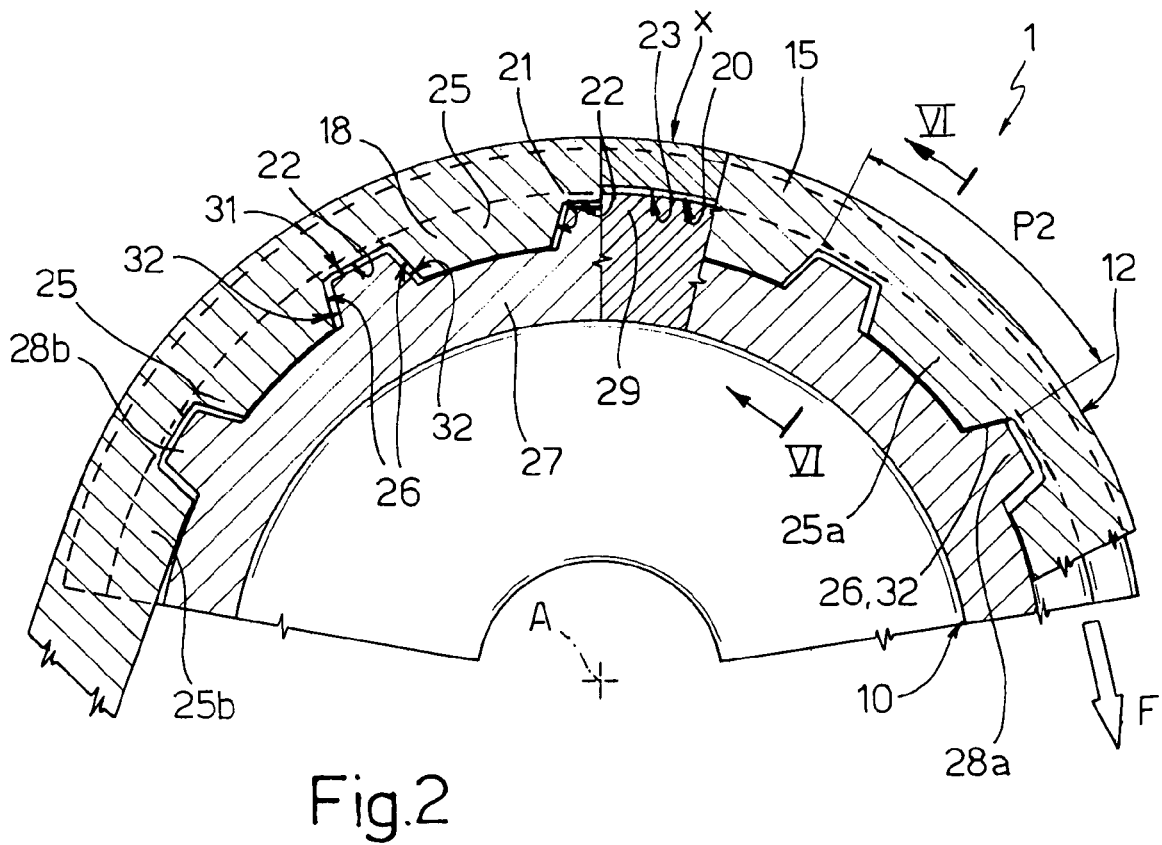
FIG. 2 illustrates, on an enlarged scale and with parts sectioned for clarity, a detail of the drive assembly in FIG. 1.
Figure 5:
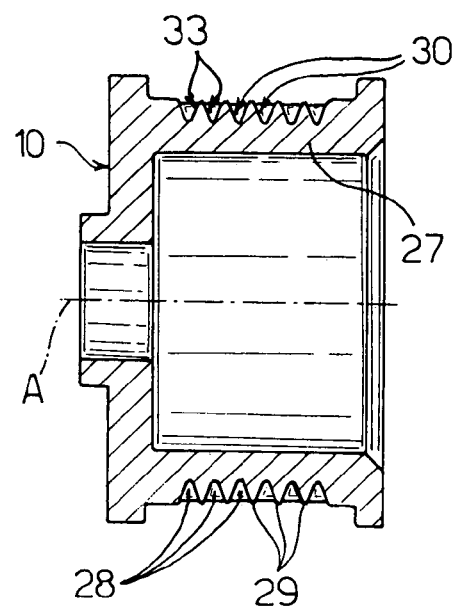
FIG. 5 is a section of the pulley in FIG. 4 along plane V-V in FIG. 4.
Figure 3:
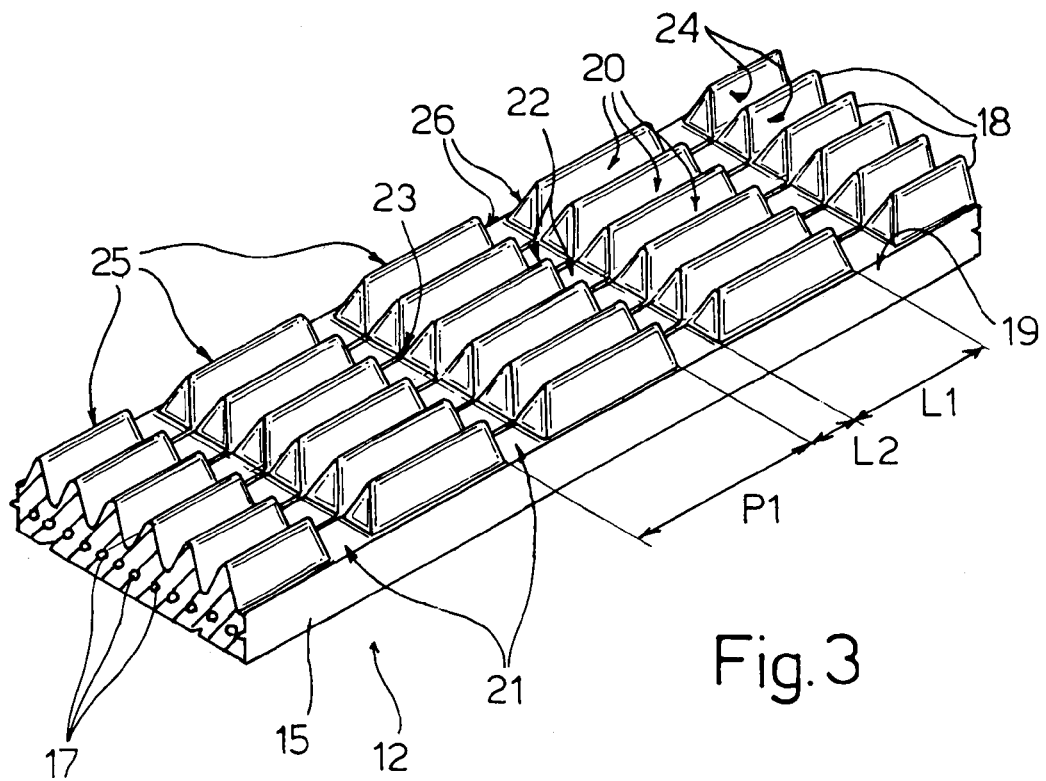
FIG. 3 is an enlarged perspective view of a detail of the belt of the drive assembly in FIGS. 1 and 2.

With reference to the FIGS. 2 and 3, the belt 12 is of the type with multiple or poly-V grooves, that is the body 15 comprises a plurality of longitudinal ridges 18 or ribs, which extend projecting from an internal surface 19 of the body 15 and have on their cross section a substantially V-shaped profile. The ribs 18 lie next to one another along the width of the body 15 and define transversely among them a plurality of longitudinal grooves 20, also substantially V-shaped, delimited by sides 24.

The belt 12 presents a plurality of transverse cavities 21, which are spaced at equal distances from each other along the belt itself, they are rectilinear and are made through the ribs 18 in a direction at a right angle to the direction 16, so that they interrupt the ribs 18 in a series of successive longitudinal sections defining respective teeth 25 of the belt 12.

Also with reference to the FIGS. 2 and 3, the cavities 21 have a depth at the most equal to the depth of the grooves 20, and preferably shorter, so that the bottom surfaces 23 of the grooves 20 extend uninterruptedly along the bottom surface 22 of the cavities 21, which therefore have a "striped" appearance (FIG. 3).

The cavities 21, sectioned with a longitudinal plane at a right angle to the body 15, present an isosceles trapezoidal profile defined by the bottom surface 22 and by two symmetrical sides 26 (FIG. 2).

The ratio between the length L1 of the teeth 25 and the longitudinal width L2 of the cavities 21, measured along the bottom surface 22, is such as to allow, in dry conditions, the transfer of the necessary torque by friction and, purely as an example, the ratio is higher than 1, preferably higher than 2.

The cavities 21 may be obtained by moulding and subsequently the belt 12 is subjected to a mechanical removing phase to form the typical grooves 20 of a poly-V belt. In fact, while the pulleys 6 and 8 are standard poly-V pulleys, the pulley 10, while being of the poly-V type, that is with a plurality of circumferential ribs 29 having a V-shaped section, interspaced with grooves 30, also presents a plurality of teeth 28 set at equal distances from each other along the circumference, which transversely intersect the ribs 29. The teeth 28 engage the cavities 21 along the meshing arc between the pulley 10 and the belt 12 (FIG. 2).

The ribs 29 engage by friction the respective grooves 20 of the belt 12; the transmission of torque takes place by friction between the sides 33 of the ribs 29 of the pulley 10 and the functionally similar ribs of the pulley 8 and the sides 24 of the grooves 20 of the pulley 12.

Figure 6:
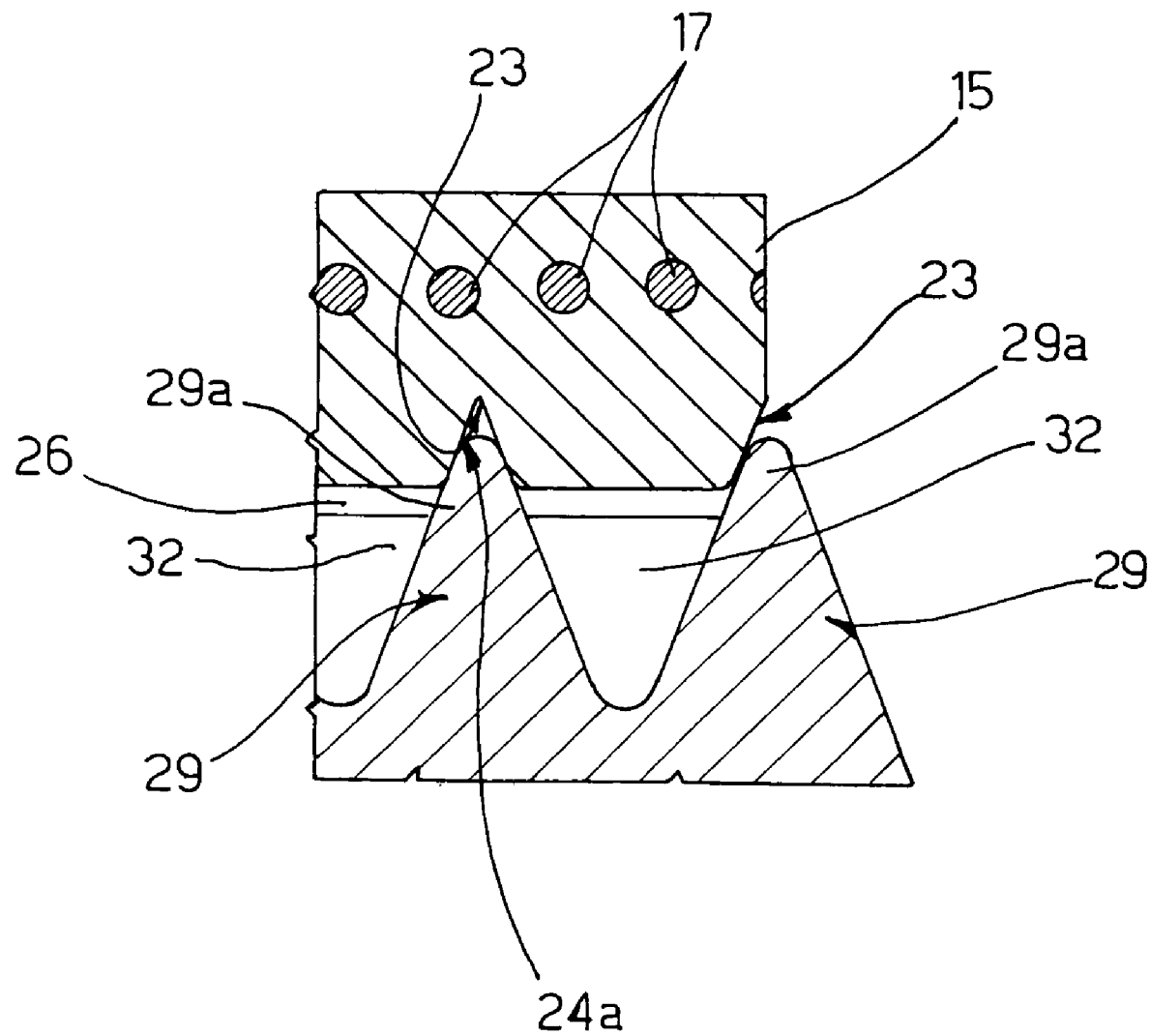
FIG. 6 is an enlarged section along the line VI-VI in FIG. 2.

According to an important characteristic of the present invention, the ribs 29 of the pulley 10 present a radial height larger than the teeth 28 and cooperate in contact with respective end portions 24a of the sides 24, the extension of which defines the bottom surfaces 23 corresponding to the cavities 21, as is clearly visible in FIG. 6 and in the detail in FIG. 2 marked with X relating to a partial section with a plane passing through the mid-point of a rib 29 of the pulleys 10 and of a groove 20 of the belt 12. In this way the contact is always along the sides 24 and the crests 29a at the top of the respective ribs 29 do not come in contact with the bottom surfaces 23.

Figure 4:
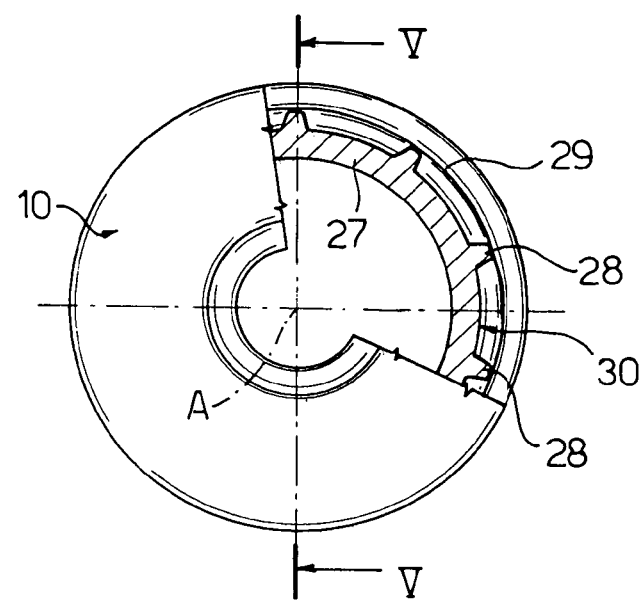
FIG. 4 is a front view, with parts removed for clarity and on an enlarged scale, of a pulley of the drive assembly in FIGS. 1 and 2.

The teeth 28, sectioned by means of a plane at a right angle to the axis A of the pulley 10 (FIGS. 2 and 4) have an isosceles trapezoidal profile similar to that of the cavities 21 and comprising suitable fillet radii. In particular, the teeth 28 present a head surface 31 and two symmetrical sides 32 converging on one another towards the surface 31 itself. The teeth 28 have a radial height smaller than the depth of the cavities 21 of the belt 12, so the head surface 31 is radially distanced from the bottom surface 22 of the cavities 21 (FIG. 2).

The teeth 28 circumferentially present a width smaller than the longitudinal width of the cavities 21, so they engage the cavities 21 with circumferential play. Moreover, according to a preferred embodiment of the present invention, the pitch P1 between the cavities 21 of the belt 12 is larger than the pitch P2 between the teeth 28.

Conveniently, the cords 17 are substantially inextensible, like those normally used in toothed belts, and they may be made of one or more materials chosen from the group comprising glass, aramidic fibres and carbon fibres, etc.

What is illustrated in FIG. 2 corresponds to an operative condition in which the internal combustion engine 3 is running, and the machine 5 acts as a generator under the driving action of the belt 12.

The difference in pitch is calculated so that along the winding arc only a pair of teeth of the belt 12 and of the pulley 10, indicated respectively with 25a and 28a, are actually engaged; in particular, due to the inevitable relative slipping between the belt 12 and the pulley 10 which in the operative condition described cause a tendency of the pulley 10 to "delay" with respect to the belt 12, and considering the direction of rotation and drive indicated by the arrow F, only the last teeth 25a, 28a close to the exit of the winding arc are really in contact with each other along their own sides 26,32, while the other pairs of teeth which precede them along the winding arc are not engaged, thanks to the above-mentioned play and to the above-mentioned difference between the pitches P1 and P2. In particular, the tooth 25b of the belt 12 which first starts to follow the winding arc enters the cavity between two consecutive teeth 28 of the pulley 10, but it does not couple, either tangentially or radially, with these teeth 28 and, therefore, does not cause any impact on the sides 32. Instead, coupling in a tangential direction between the teeth 25 and 28 occurs gradually during the rotation around the axis A of the pulley 10 along the winding arc. In this way, as a meshing impact between each pair of teeth is avoided, the noise of the group 1 is reduced when the engine 3 is running and turning over the starter/generator 5.

Instead, when the machine 5 acts as a starter and, therefore, the pulley 10 is a drive pulley, the relative angular position between the belt 12 and the pulley 10 varies with respect to the operative condition described above, due to a tendency to relative slipping in the opposite direction. In fact, in the event of slipping the belt 12 tends to "delay" with respect to the pulley 10 and therefore only the first pair of teeth along the meshing arc, that is the ones indicated with 25b and 28b, are really engaged; the contact between the teeth 25b and 28b along the respective sides 26, 32 prevents further relative slipping during the starting transient, under the torque transmitted by the pulley 10 to the belt 12.

Even if impacts take place between the sides 26,32 at the entry of winding arc in this operative condition, the consequent noise produced is substantially unnoticeable with respect to the other noise components which originate in the starting transient.

From the above it is clear how the belt 12, coupling with the pulley 10, can prevent slipping during the starting operations of the engine 3 when the machine 5 acts as a starter in wet conditions, thanks to the meshing of the teeth 25 and 28.

Movement is transmitted by contact along the lateral sides of the ribs 18,29, while the engaging of the teeth 28 in the cavities 21 performs exclusively a function of preventing slipping of the belt 12.

At the same time, the crests 29a of the ribs 29 remain continuously in contact with the sides 24 of the belt 12 and in correspondence with the cavities 21 they are in contact with the end portions 24a of the sides 24 without involving the bottom surfaces 23, so there are no impacts between the ribs 29 and the belt 12 and the noise produced by the belt drive is limited.

The noise produced by the belt drive is also reduced thanks to the radial play between the surfaces 22,31 and, when the machine 5 is acting as a generator, it is reduced by the presence of play between the teeth 28 and the cavities 21 and by the difference between the pitches P1 and P2, as described above.

Moreover, the trapezoidal profile of the cavities 21 and of the teeth 28 facilitates the coupling between the teeth 25,28 at the entry of the meshing arc.

The width 12 of the cavities 21 is sufficiently small with respect to the length L1 of the teeth 25 so as not to compromise the torque value that the belt 12 is able to transmit by friction along the lateral sides of the ribs 18; the belt 12 therefore maintains such characteristics as to be able to couple normally even with conventional poly-V pulleys.

The use of substantially inextensible cords 17 ensures the precision of meshing between the belt 12 and the pulley 10, allowing the avoiding of undesired contacts between the teeth, and therefore noise.

Lastly, from the above it is clear that modifications and variations may be made to the described belts 12 and, more generally, to the assembly 1, without departing from the scope of the present invention as defined in the appended claims.

In particular, the cavities 21 could be made not on the whole width of the body 15, but across only a part of the ribs 18, and/or they could have an arched rather than a rectilinear arrangement, and/or have a different profile from the trapezoidal one. Likewise, the teeth 28 of the pulley 10 could have a different geometry from that described as an example. In particular, the teeth 28 can comprise ridges presenting respective pairs of contact surfaces functionally similar to the sides 32, that is cooperating in contact against the sides 26 in the event of excessive slipping.

Lastly, the pitch P1 between the cavities 21 could be smaller than the pitch P2 between the teeth, for example in applications different from the one described, where a need is felt to limit noise production when the pulley 10 is driven and the belt 12 is the driver.

What is claimed is:

1. A belt drive assembly comprising:
   a belt comprising a body of elastomeric material, a plurality of longitudinal filiform inserts embedded in the body, a plurality of longitudinal ribs extending from an internal surface of said body and alternating with a plurality of longitudinal V-shaped grooves delimited by respective sides, and a plurality of cavities longitudinally spaced at equal distances from each other and extending transversely through said longitudinal ribs, wherein said longitudinal ribs define a height from the bottom of said longitudinal V-shaped grooves to the top of said longitudinal ribs, and said cavities of said belt have a depth equal to or less than the height of said longitudinal ribs;
   a pulley with multiple grooves comprising a plurality of V-shaped circumferential ribs adapted to receive the longitudinal V-shaped grooves of the belt, and a plurality of teeth located at equal distances from each other along the circumference of said pulley and extending transversely with respect to said V-shaped circumferential ribs; wherein the V-shaped circumferential ribs define a radial height from the bottom of said grooves to the top of said V-shaped circumferential ribs, and the radial height of said V-shaped circumferential ribs is greater than the radial height of said teeth, wherein said V-shaped circumferential ribs in said pulley are delimited by respective sides that engage the sides of the longitudinal V-shaped grooves in said belt to transmit torque by friction coupling between said sides of said V-shaped circumferential ribs and said sides of said longitudinal V-shaped grooves, wherein said teeth of said pulley have a circumferential length smaller than a longitudinal length of said cavities of said belt to engage the cavities with play; and
   at least one second poly-V pulley without teeth, the at least one second poly-V pulley cooperating with the V-shaped grooves of said belt.

2. Assembly according to claim 1, wherein said cavities of said belt have a depth shorter than the height of said longitudinal ribs.

3. Assembly according to claim 1, wherein said V-shaped circumferential ribs of said pulley contact with said belt continuously along a winding arc of the belt onto the pulley.

4. Assembly according to claim 1, wherein said teeth of said pulley engage said cavities with radial play with respect to a bottom surface of the cavities.

5. Assembly according to claim 1, wherein a pitch (P1) between the cavities is larger than a pitch (P2) between the teeth.

6. Assembly according to claim 1, wherein said longitudinal filiform inserts are substantially inextensible.

7. Assembly according to claim 1, wherein said teeth define an isosceles trapezoidal cross-section.

8. A mechanical power transmission system comprising:
   a driver pulley;
   at least one driven pulley; and
   a belt in driving engagement with said driver pulley and said driven pulley, said belt comprising a body, a plurality of longitudinal ribs extending from an internal surface of said body and alternating with a plurality of longitudinal V-shaped grooves delimited by respective sides, and a plurality of cavities longitudinally spaced at equal distances from each other and extending transversely through said longitudinal ribs, wherein said longitudinal ribs define a height from the bottom of said longitudinal V-shaped grooves to the top of said longitudinal ribs, and said cavities of said belt have a depth equal to or less than the height of said longitudinal ribs;
   wherein at least one of said driver pulley or said driven pulley includes:
   multiple grooves comprising a plurality of V-shaped circumferential ribs adapted to receive the longitudinal V-shaped grooves of the belt; and
   a plurality of teeth located at equal distances from each other along the circumference of said pulley and extending transversely with respect to said V-shaped circumferential ribs;
   wherein the V-shaped circumferential ribs define a radial height from the bottom of said grooves to the top of said V-shaped circumferential ribs, and the radial height of said V-shaped circumferential ribs is greater than the radial height of said teeth, wherein said V-shaped circumferential ribs in said pulley are delimited by respective sides that engage the sides of the longitudinal V-shaped grooves in said belt to transmit torque by friction coupling between said sides of said V-shaped circumferential ribs and said sides of said longitudinal V-shaped grooves.

* * * * *